United States Patent
Hashimoto et al.

(10) Patent No.: US 12,195,287 B2
(45) Date of Patent: Jan. 14, 2025

(54) ROBOT SYSTEM AND METHOD OF OPERATING THE SAME

(71) Applicant: Kawasaki Jukogyo Kabushiki Kaisha, Kobe (JP)

(72) Inventors: Takeshi Hashimoto, Kobe (JP); Kazunori Hirata, Kobe (JP); Toshiyuki Tsujimori, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 356 days.

(21) Appl. No.: 17/778,016

(22) PCT Filed: Nov. 20, 2020

(86) PCT No.: PCT/JP2020/043354
§ 371 (c)(1),
(2) Date: May 19, 2022

(87) PCT Pub. No.: WO2021/100845
PCT Pub. Date: May 27, 2021

(65) Prior Publication Data
US 2022/0396437 A1    Dec. 15, 2022

(30) Foreign Application Priority Data
Nov. 20, 2019   (JP) ................. 2019-209743

(51) Int. Cl.
*B65G 47/90*    (2006.01)
*B25J 15/06*    (2006.01)
*B65G 47/91*    (2006.01)

(52) U.S. Cl.
CPC .......... *B65G 47/91* (2013.01); *B65G 47/907* (2013.01)

(58) Field of Classification Search
None
See application file for complete search history.

(56) References Cited

U.S. PATENT DOCUMENTS

| | | | |
|---|---|---|---|
| 3,610,673 A | 10/1971 | Strombeck et al. | |
| 2005/0005513 A1 | 3/2005 | Matsumoto et al. | |
| 2015/0104284 A1 | 4/2015 | Riedel | |
| 2019/0193277 A1* | 6/2019 | Bando | B25J 15/0038 |

FOREIGN PATENT DOCUMENTS

| | | |
|---|---|---|
| DE | 102004012592 B4 | 3/2006 |
| DE | 102013220798 A1 | 4/2015 |
| EP | 2743040 A2 | 6/2014 |
| JP | H06-321204 A | 11/1994 |
| JP | 2019-927 A | 1/2019 |

* cited by examiner

*Primary Examiner* — Jaime Figueroa
*Assistant Examiner* — Atticus A Cameron
(74) *Attorney, Agent, or Firm* — XSENSUS LLP

(57) ABSTRACT

A robot system of the present invention includes: a first hand including first holders, a first link structure, and a first engager; a second hand including second holders, a second link structure, and a second engagement receiver; a first arm to which the first hand is connected; a second arm to which the second hand is connected; and a controller configured to perform: (A) operating the first arm and/or the second arm to engage the first engager with the second engagement receiver; and (B) operating the first arm to change a distance between the first holders after performing (A).

18 Claims, 13 Drawing Sheets

ROBOT SYSTEM AND METHOD OF OPERATING THE SAME

CROSS-REFERENCE TO RELATED APPLICATIONS

This application is based on PCT filing PCT/JP2020/043354, filed Nov. 20, 2020, which claims the priority of Japanese Patent Application No. 2019-209743, filed on Nov. 20, 2019, in Japan Patent Office, which is incorporated as a part of this application by reference in the entirety.

TECHNICAL FIELD

The present invention relates to a robot system and a method of operating the robot system.

BACKGROUND ART

A robot apparatus adapted for accurate and simultaneous positioning of components is known (see Patent Literature 1, for example).

In the robot apparatus disclosed in Patent Literature 1, a component positioner is disposed at the distal end of a robot arm. The component positioner includes: a pinion rotatable about an axis by a rotational drive source (servomotor); a link structure (pantograph structure) openable and closable by a pair of racks; and holders supported by the link structure. The distance between the adjacent holders is changed in response to opening or closing of the link structure, and thus the holders are positioned.

CITATION LIST

Patent Literature

PTL 1: Japanese Laid-Open Patent Application Publication No. 2019-927

SUMMARY OF INVENTION

Technical Problem

The robot apparatus disclosed in Patent Literature 1 includes the rotational drive source, pinion, and pair of racks in order to change the distance between the holders. This involves an increase in the weight of the distal end of the robot arm, resulting in the inability to hold and transfer heavy workpieces.

The present invention has been made to solve the above conventional problem, and an object of the present invention is to provide: a robot system capable of holding and transferring heavier workpieces than conventional robot systems; and a method of operating the robot system.

Solution to Problem

In order to solve the conventional problem described above, a robot system according to the present invention includes: a first hand including first holders, a first link structure that changes a distance between the first holders, and a first engager; a second hand including second holders, a second link structure that changes a distance between the second holders, and a second engagement receiver; a first arm to which the first hand is connected; a second arm to which the second hand is connected; and a controller configured to perform: (A) operating the first arm and/or the second arm to engage the engager with the engagement receiver; and (B) operating the first arm to change the distance between the first holders after performing (A).

Thus, the distance between the first holders and the distance between the second holders can be changed without equipping the first and second hands with actuators for changing the distance between the first holders and the distance between the second holders. Thanks to the absence of actuators for changing the distance between the first holders and the distance between the second holders, the robot system is capable of holding and transferring heavier workpieces than conventional robot systems.

A method according to the present invention is a method of operating a robot system, the robot system including: a first hand including first holders, a first link structure that changes a distance between the first holders, and an engager; a second hand including second holders, a second link structure that changes a distance between the second holders, and an engagement receiver; a first arm to which the first hand is connected; and a second arm to which the second hand is connected, the method including: (A) operating the first arm and/or the second arm to engage the engager with the engagement receiver; and (B) operating the first arm to change the distance between the first holders after performing (A).

Thus, the distance between the first holders and the distance between the second holders can be changed without equipping the first and second hands with actuators for changing the distance between the first holders and the distance between the second holders. Thanks to the absence of actuators for changing the distance between the first holders and the distance between the second holders, it is possible to cause the robot system to hold and transfer heavier workpieces than conventional robot systems.

The above and further objects, features and advantages of the present invention will be more apparent from the following detailed description of preferred embodiments with reference to the accompanying drawings.

Advantageous Effects of Invention

In the robot system of the present invention and the method of operating the robot system, the first and second hands are not equipped with any actuators for changing the distance between the first holders and the distance between the second holders. Thus, it is possible to cause the robot system to hold and transfer heavier workpieces than conventional robot systems.

DESCRIPTION OF EMBODIMENTS

Hereinafter, exemplary embodiments of the present invention will be described with reference to the drawings. The same or like elements are denoted by the same reference signs throughout the drawings and will not be described repeatedly. In all of the drawings, some elements are selectively depicted to illustrate the present invention, and the other elements may be omitted. The present invention is not limited to the embodiments described below.

Embodiment 1

A robot system according to Embodiment 1 includes: a first hand including first holders, a first link structure that changes a distance between the first holders, and an engager; a second hand including second holders, a second link structure that changes a distance between the second holders, and an engagement receiver; a first arm to which the first hand is connected; a second arm to which the second hand is connected; and a controller configured to perform: (A) operating the first arm and/or the second arm to engage the engager with the engagement receiver; and (B) operating the first arm to change the distance between the first holders after performing (A).

In the robot system according to Embodiment 1, the controller may be further configured to perform (C) operating the second arm to change the distance between the second holders after performing (B).

In the robot system according to Embodiment 1, the first hand may further include an engagement receiver, the second hand may further include an engager, and the controller may be configured to, in performing (A), operate the first arm and/or the second arm to engage the engager of the first hand with the engagement receiver of the second hand and engage the engager of the second hand with the engagement receiver of the first hand.

Hereinafter, an example of the robot system according to Embodiment 1 will be described with reference to FIGS. 1 to 11.

Configuration of Robot System

Figure 1:
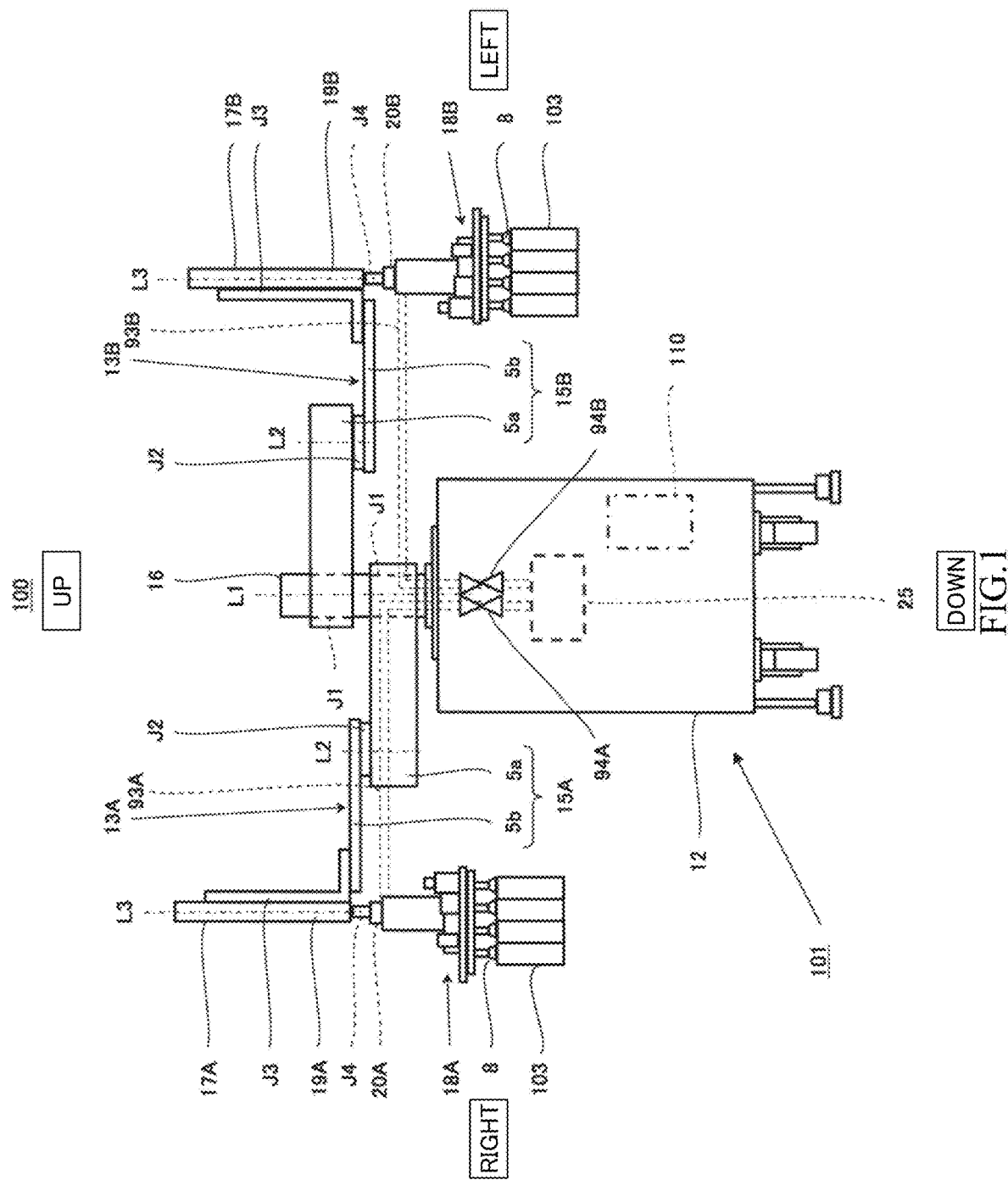
FIG. 1 is a schematic diagram showing a schematic configuration of a robot system according to Embodiment 1.
Figure 2:
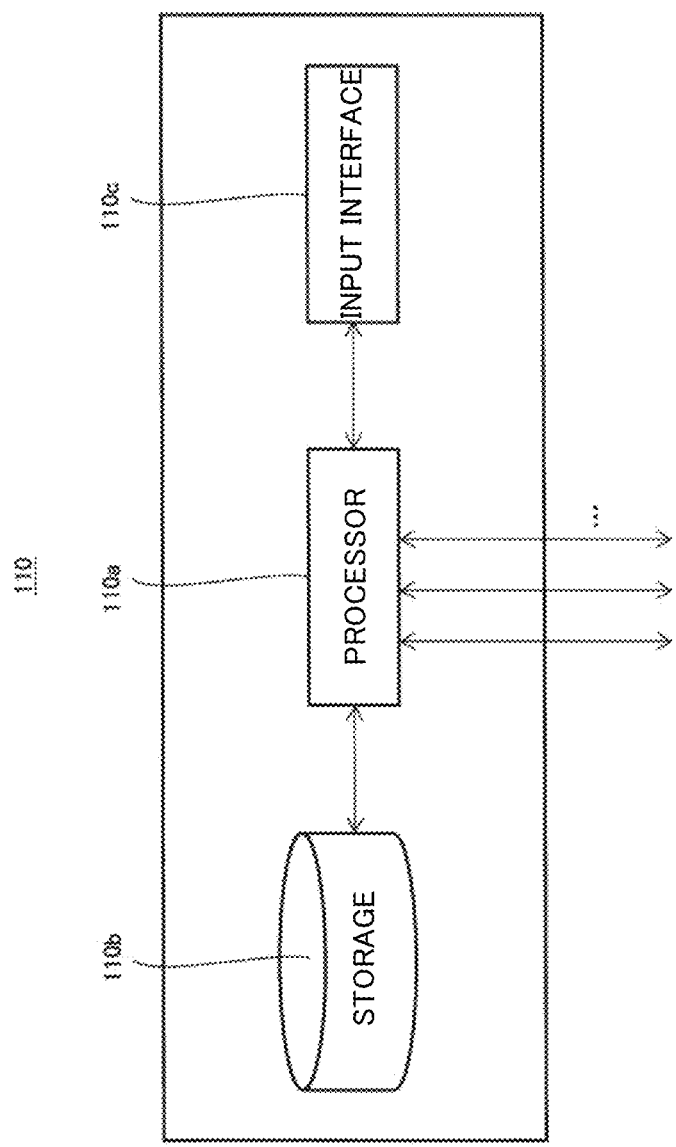
FIG. 2 is a functional block diagram schematically showing the configuration of a controller of a robot of FIG. 1.

FIG. 1 is a schematic diagram showing a schematic configuration of the robot system according to Embodiment 1. FIG. 2 is a functional block diagram schematically showing the configuration of a controller of a robot of FIG. 1.

The up-down and left-right directions indicated in FIG. 1 are those defined with respect to the robot.

A horizontal multi-articulated dual-arm robot is illustrated as the robot of the robot system according to Embodiment 1 in the following description, but this is not intended to be limiting. Other robots such as another type of horizontal multi-articulated robot or a vertical multi-articulated robot may be employed as the robot of the robot system according to Embodiment 1.

As shown in FIG. 1, the robot system 100 according to Embodiment 1 includes a robot 101, and the robot 101 includes a cart 12, a first arm 13A, a second arm 13B, a vacuum generator 25 disposed within the cart 12, and a controller 110. The controller 110 is also disposed within the cart 12.

Although Embodiment 1 employs a configuration in which the controller 110 and vacuum generator 25 are disposed within the cart 12, this is not intended to be limiting. The controller 110 and vacuum generator 25 may be disposed outside the cart 12.

The vacuum generator 25 is connected by pipes 93A and 93B to suction end devices (suction structures) 8 of the first and second arms 13A and 13B described later. The vacuum generator 25 is a device that creates a negative pressure in each suction end device 8. For example, a vacuum pump or CONVUM (registered trademark) may be used as the vacuum generator 25.

The pipes 93A and 93B are equipped with on-off valves 94A and 94B, respectively. Each of the on-off valves 94A and 94B opens or closes the corresponding one of the pipes 93A and 93B to allow the suction end devices (first or second holders) 8 to suck (hold) or release workpieces 103. The operation of the vacuum generator 25 and the opening and closing of the on-off valves 94A and 94B are controlled by the controller 110.

A base shaft 16 is fixed to the upper surface of the cart 12. The first and second arms 13A and 13B are mounted on the base shaft 16 so as to be rotatable about a rotation axis L1 coinciding with the central axis of the base shaft 16. In particular, the first and second arms 13A and 13B are located at different heights. The first and second arms 13A and 13B are movable both independently of and in conjunction with each other.

The first arm 13A includes a first arm portion 15A, a first wrist portion 17A, a first hand 18A, and a first attachment portion 20A. Likewise, the second arm 13B includes a second arm portion 15B, a second wrist portion 17B, a second hand 18B, and a second attachment portion 20B. The second arm 13B has the same basic configuration as the first arm 13A and will therefore not be described in detail.

In Embodiment 1, the first arm portion 15A includes first and second links 5a and 5b each of which is generally in the shape of a rectangular parallelepiped. A rotary joint J1 is disposed at the proximal end of the first link 5a, and a rotary joint J2 is disposed at the distal end of the first link 5a. A linear-motion joint J3 is disposed at the distal end of the second link 5b.

The first link 5a is coupled at its proximal end to the base shaft 16 via the rotary joint J1 and rotatable about the rotation axis L1 by the rotary joint J1. The second link 5b is coupled at its proximal end to the distal end of the first link 5a via the rotary Joint J2 and rotatable about a rotation axis L2 by the rotary Joint J2.

The first wrist portion 17A is coupled to the distal end of the second link 5b via the linear-motion joint J3 so as to be movable upward and downward relative to the second link 5b. A rotary joint J4 is disposed at the lower end of the first wrist portion 17A, and a first attachment portion 20A is disposed at the lower end of the rotary joint J4.

The first attachment portion 20A is configured for removable attachment of the first hand 18A. Specifically, for example, the first attachment portion 20A includes a pair of rod members the distance between which is adjustable, and the first hand 18A can be attached to the first wrist portion 17A by holding the first hand 18A between the pair of rod members. Thus, the first hand 18A is rotatable about a rotation axis L3 by the rotary joint J4. Each of the rod members may have a bent distal end portion. The construction of the first hand 18A will be described later.

Each of the joints J1 to J4 of the first and second arms 13A and 13B is equipped with a drive motor (not shown), which is an example of an actuator by which the two components coupled by the joints is rotated or moved up and down relative to each other. The drive motor may be, for example, a servomotor servo-controlled by the controller 110. Each of the joints J1 to J4 is further equipped with a rotation sensor (not shown) that detects the rotational position of the drive motor and a current sensor (not shown) that detects a current for control of the rotation of the drive motor. The rotation sensor may be, for example, an encoder.

As shown in FIG. 2, the controller 110 includes a processor 110a, a storage 110b, and an input interface 110c. The processor 110a is embodied, for example, by a microprocessor or CPU. The processor 110a retrieves and executes software such as a basic program stored in the storage 110b, thus controlling various operations of the robot system 100.

The storage 110b stores the basic program and pieces of information such as various kinds of fixed data. The storage 110b need not consist of a single device and may be embodied as a combination of two or more storage media (e.g., a random access memory and a hard disk drive). In the case where the processor 110a is embodied by a microcomputer, the storage 110b may be embodied, at least in part, as an internal memory of the microcomputer or may be embodied as a memory independent of the microcomputer.

The input interface 110c is a device by which various parameters related to control of the robot system 100 and other kinds of data can be input to the processor 110a. The input interface 110c is embodied by a known input device such as a keyboard, a touch panel, or a set of button switches. In Embodiment 1, data which can be input by the input interface 110c may include, for example, conditions related to holding of the workpieces 103 (such as the weight of the workpieces 103) and the number of the workpieces 103 to be placed into a container.

The controller 110 may be embodied by a single controller 110 that performs centralized control or may be embodied by two or more controllers 110 that cooperate to perform distributed control. The controller 110 may be embodied by a microcomputer and may be embodied by an MPU, a PLC (Programmable Logic Controller), a logic circuit, etc.

Hereinafter, the first hand 18A of the first arm 13A will be described in detail with reference to FIGS. 3 to 5. The second hand 18B of the second arm 13B has the same basic configuration as the first hand 18A and will therefore not be described in detail.

Figure 3:
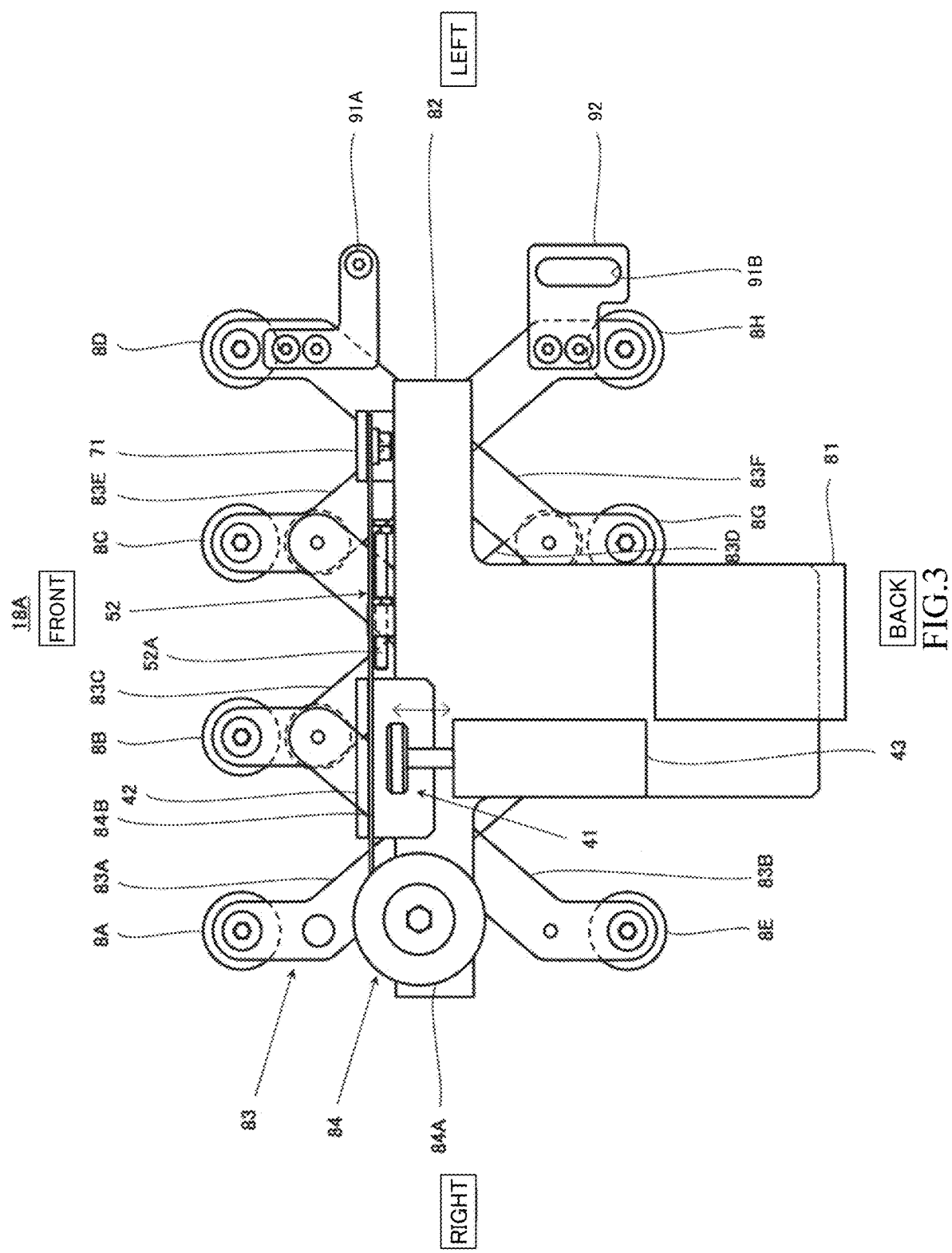
FIG. 3 is a schematic diagram showing a schematic configuration of the upper side of a first hand of the robot of FIG. 1.

FIG. 3 is a schematic diagram showing a schematic configuration of the upper side of the first hand of the robot of FIG. 1. FIG. 4 is a schematic diagram showing a schematic configuration of the back side of the first hand of the robot of FIG. 1. FIG. 5 is a schematic diagram showing a schematic configuration of key parts of the first hand of the robot of the FIG. 1.

Figure 4:
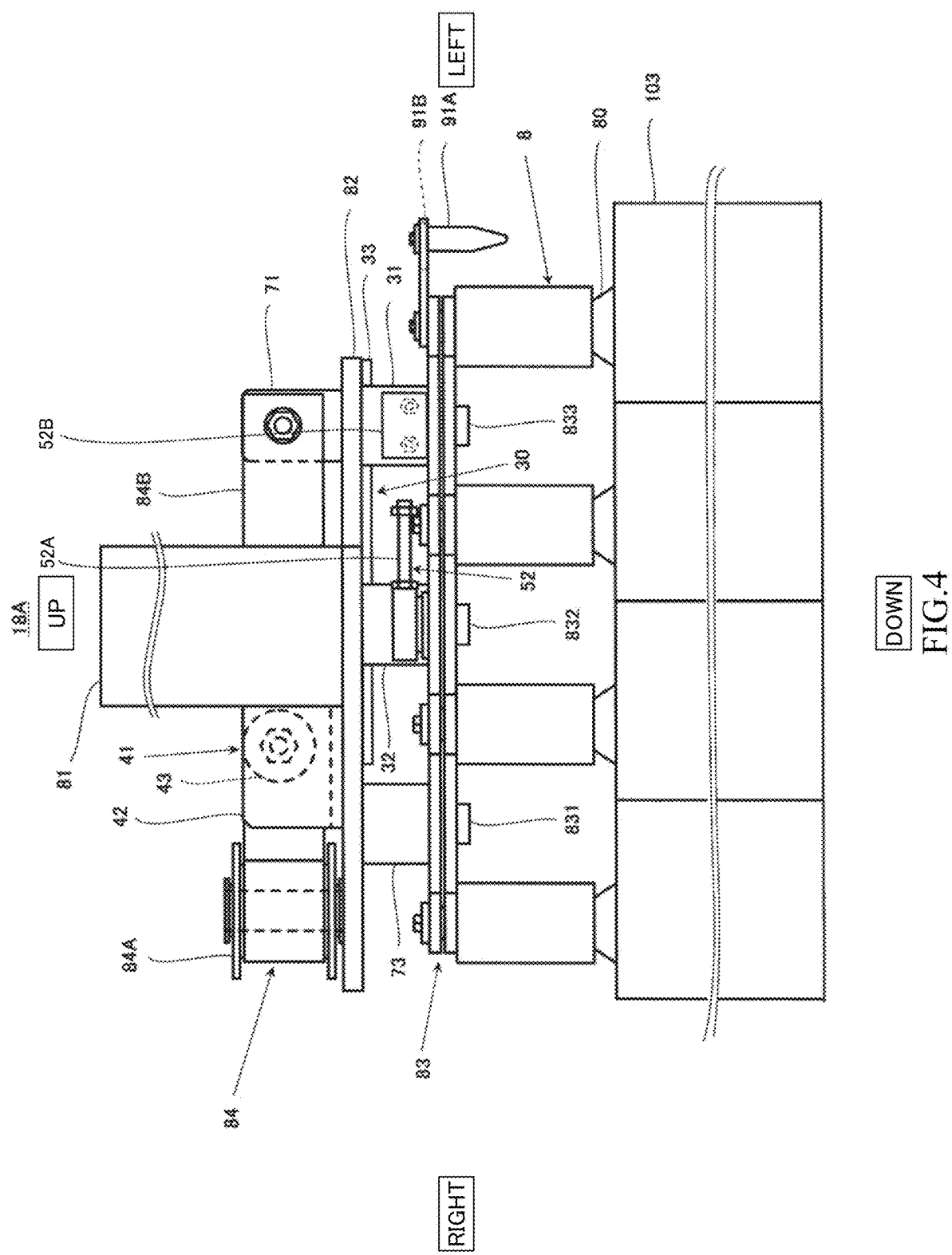
FIG. 4 is a schematic diagram showing a schematic configuration of the back side of the first hand of the robot of FIG. 1.
Figure 5:
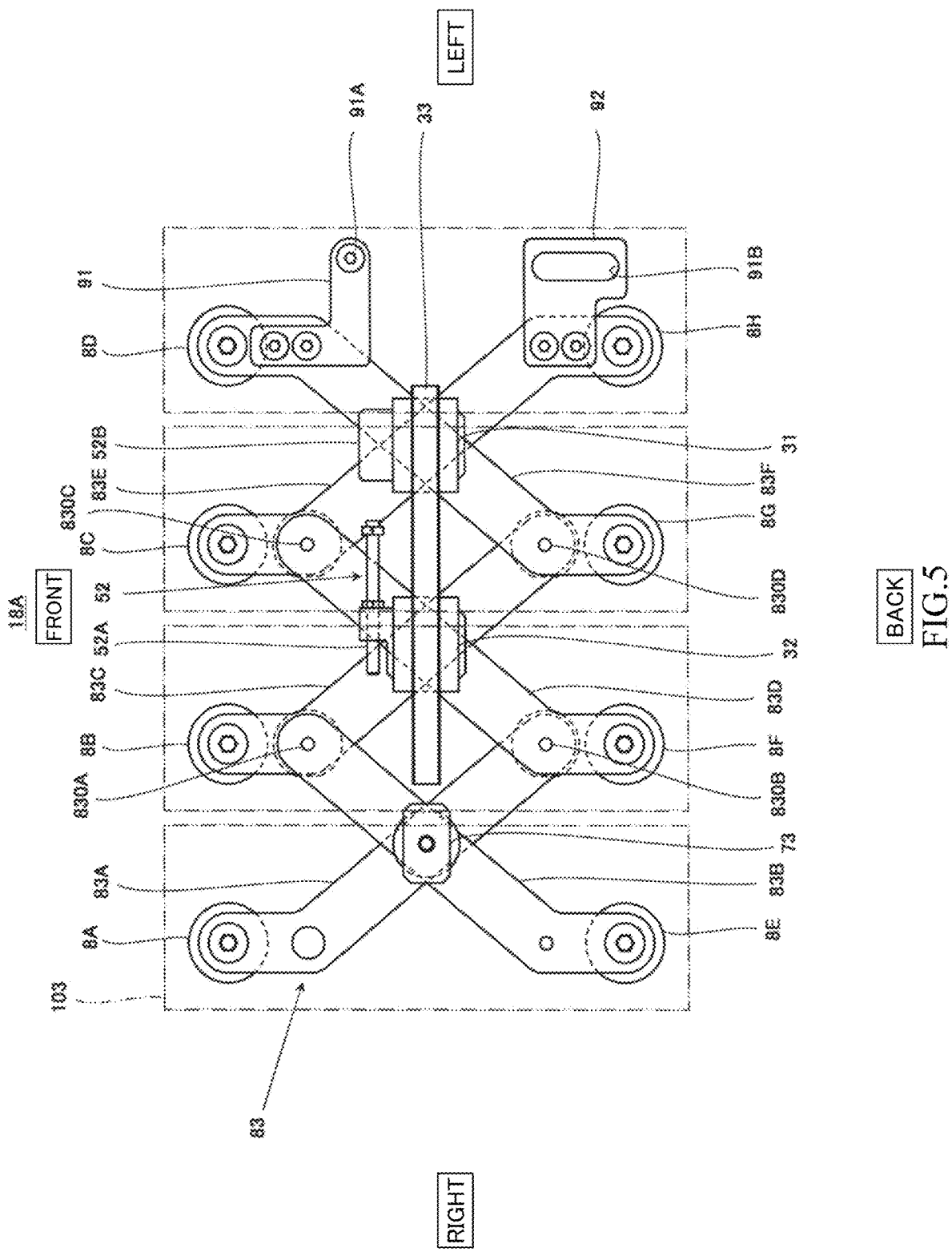
FIG. 5 is a schematic diagram showing a schematic configuration of key parts of the first hand of the robot of FIG. 1.

The front-back, left-right, and up-down directions indicated in FIGS. 3 to 5 are those defined with respect to the robot (first hand). The workpieces are omitted in FIGS. 3 and 5.

As shown in FIGS. 3 to 5, the first hand 18A of the first arm 13A includes a main body 81, a base member 82, a link structure (first link structure) 83, and suction end devices 8A to 8H. The suction end devices 8A to 8H may be referred to as "suction end devices 8" where they need not be differentiated from one another.

In Embodiment 1, the main body 81 is embodied in the form of a housing, and the base member 82 is disposed at the lower end of the main body 81. The base member 82, as viewed in the up-down direction, is generally T-shaped. Below the base member 82 is located the link structure 83 which is configured to be extendable and retractable in the left-right direction.

A first structure 84 is disposed at the right end of the upper surface of the base member 82. The first structure 84 includes a drum 84A and a tape 84B. A spiral spring (not shown) is disposed in the interior of the drum 84A. The proximal end of the tape 84B is connected to the spiral spring, and the distal end of the tape 84B is fixed to a first stationary member 71. The first stationary member 71 is connected to the link structure 83 via a first guide member 31 of a linear guide 30 described later. Thus, the link structure 83 extended can be retracted by the spring force of the spiral spring.

A first stopper 41 is disposed generally at the center of the upper surface of the base member 82. The first stopper 41 includes a generally L-shaped second stationary member 42 and a linear actuator 43. In Embodiment 1, the linear actuator 43 includes a cylinder, a piston, and a driver that advances and retracts the piston.

The first stopper 41 is configured such that the distal end surface of the linear actuator 43 contacts and presses the major surface of the tape 84B and that the tape 84B is sandwiched between the distal end surface of the linear actuator 43 and the major surface of the second stationary member 42.

Thus, the tape 84B retracted by the spring force of the spiral spring can be stopped. As such, the link structure 83 can be set to a desired length (kept at a desired length), and the distance between the suction end devices 8 adjacent to each other in the left-right direction can be set to a desired distance.

It is sufficient for the linear actuator 43 to be configured such that the friction force resulting from sandwiching of the tape 84B is greater than the spring force of the spiral spring. Thus, a compact motor can be used as the driver of the linear actuator 43. This can reduce the increase in the weight of the first hand 18A, enabling the robot system 100 to hold and transfer heavier workpieces than conventional robot systems.

Furthermore, a third stationary member 73 and a linear guide 30 are disposed beneath the lower surface of the base member 82. The distal end of a first shaft member 831 of the link structure 83 described later is fitted in the third stationary member 73.

The linear guide 30 includes a first guide member 31, a second guide member 32, and a rail member 33. The rail member 33 is shaped to extend in the left-right direction and configured to guide the first and second guide members 31 and 32.

A second stopper 52 is disposed at the front of the first and second guide members 31 and 32. The second stopper 52 includes a rod-shaped first member 52A and a box-shaped second member 52B and is configured such that the distal end of the first member 52A contacts the second member 52B to stop retraction of the tape 84B. The length of the first member 52A is predetermined so as to avoid contact between the adjacent suction end devices 8.

The distal end of a second shaft member 832 of the link structure 83 described later is fitted in the second guide member 32, while the distal end of a third shaft member 833 of the link structure 83 is fitted in the first guide member 31.

The link structure 83 used in Embodiment 1 is a pantograph structure and includes strip-shaped link members 83A to 83F and first to third shaft members 831 to 833. The link structure 83 used may be a rail structure configured to change the distance between the two suction end devices 8.

The link members 83A and 83B, as viewed in the up-down direction, are arranged in an X-shape, and the first shaft member 831 is inserted at the point of intersection between the link members 83A and 83B. Likewise, the link members 83C and 83D, as viewed in the up-down direction, are arranged in an X shape, and the second shaft member 832 is inserted at the point of intersection between the link members 83C and 83D. The link members 83E and 83F, as viewed in the up-down direction, are also arranged in an X-shape, and the third shaft member 833 is inserted at the point of intersection between the link members 83E and 83F.

Each of the link members 83A to 83D is bent near its right end, and the suction end device 8 is disposed at the right end (proximal end) of each of the link members 83A to 83D. Each of the link members 83E and 83F is bent near both right and left ends, and the suction end devices 8 are disposed at the right and left ends (proximal and distal ends) of each of the link members 83E and 83F. A suction pad 80 in the shape of a truncated cone is disposed at the distal end (lower end) of each suction end device 8.

The link member 83A is pivotally connected at its distal end to the bend of the link member 83D by a shaft member 830B. Likewise, the link member 83B is pivotally connected at its distal end to the bend of the link member 83C by a shaft member 830A.

The link member 83C is pivotally connected at its distal end to the right bend of the link member 83F by a shaft member 830D. Likewise, the link member 83D is pivotally connected at its distal end to the right bend of the link member 83E by a shaft member 830C.

An L-shaped first connection member 91 is disposed at the left bend of the link member 83F. A pin-shaped first engager (engager) 91A is disposed at the distal end of the first connection member 91. An L-shaped second connection member 92 is disposed at the left bend of the link member 83E. The major surface of the second connection member 92 is provided with a hole, and this hole serves as a first engagement receiver (engagement receiver) 91B.

Figure 8:
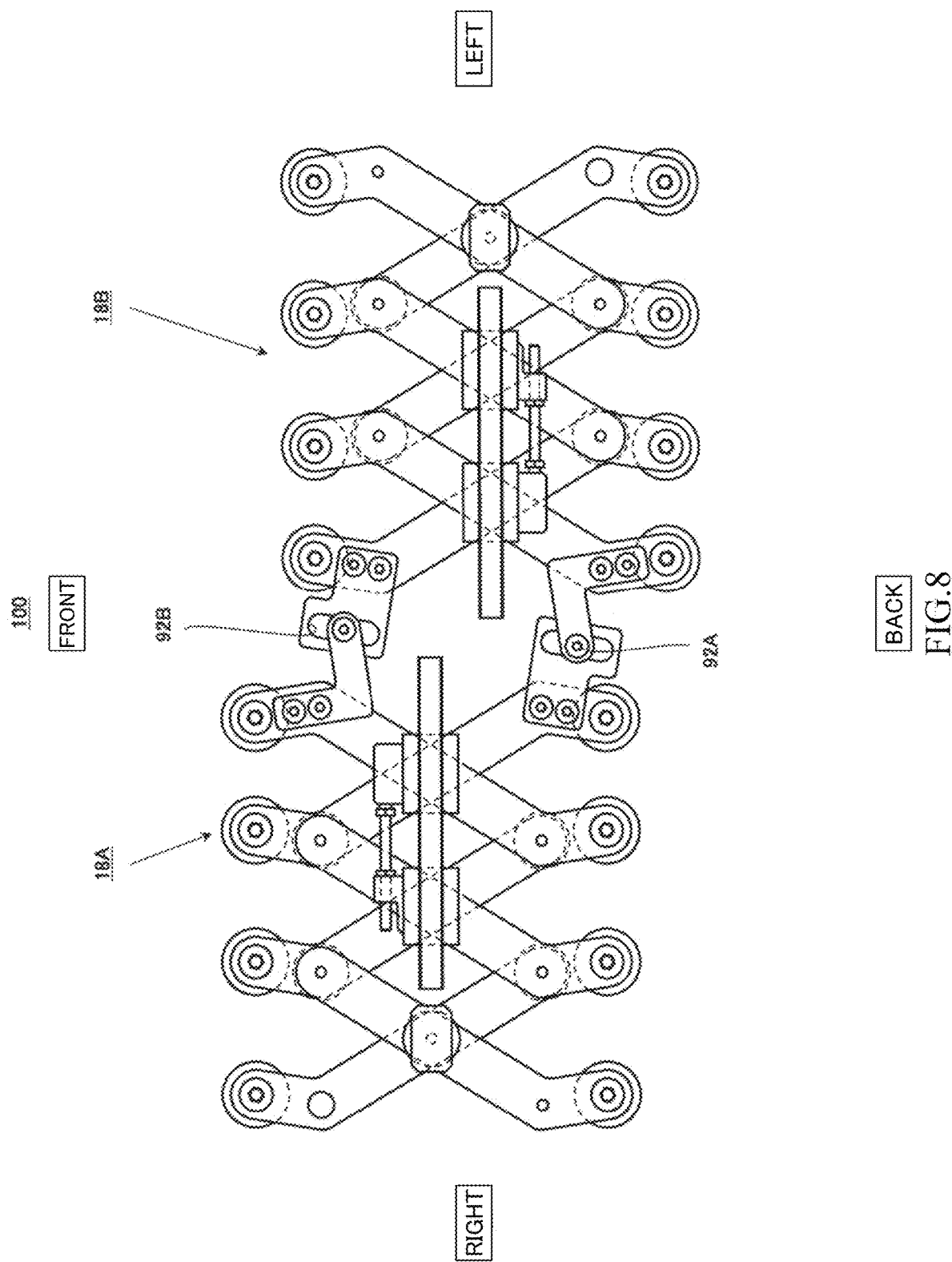
FIG. 8 is a 1 schematic diagram showing a state that the robot enters while the robot system is operated in line with the flowcharts shown in FIGS. 6A and 6B.
Figure 9:
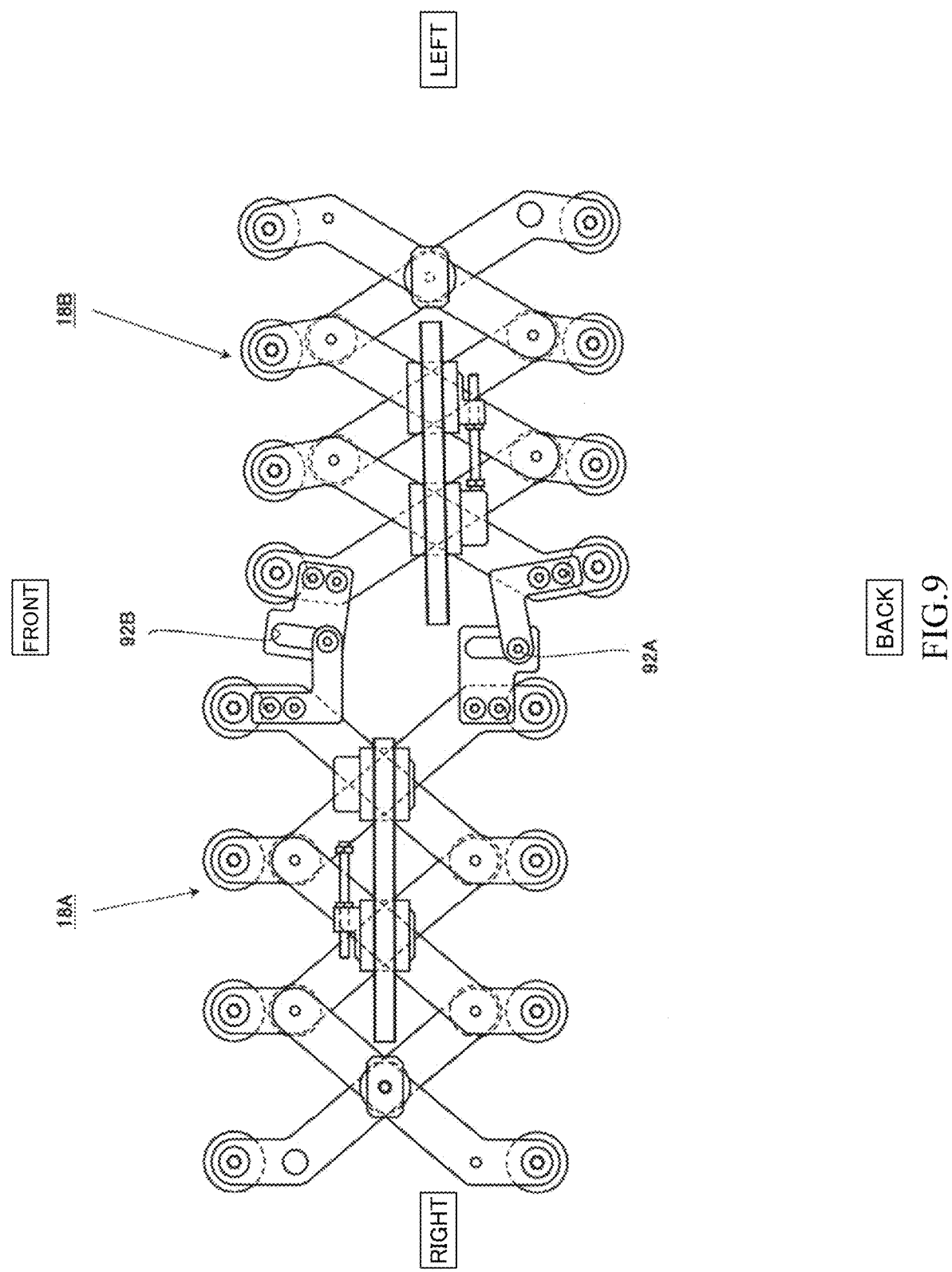
FIG. 9 is a schematic diagram showing a state that the robot enters while the robot system is operated in line with the flowcharts shown in FIGS. 6A and 6B.
Figure 10:
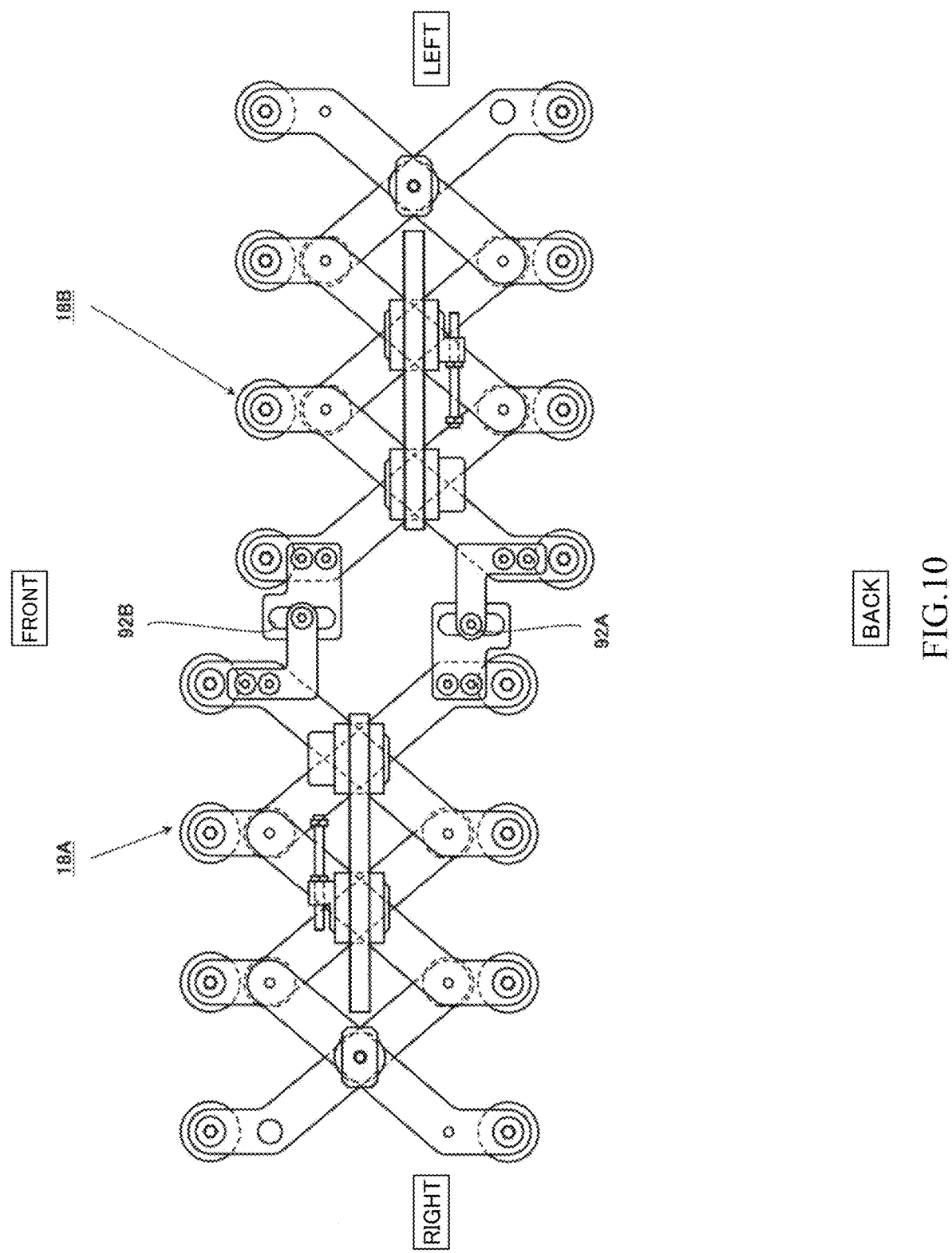
FIG. 10 is a schematic diagram showing a state that the robot enters while the robot system is operated in line with the flowcharts shown in FIGS. 6A and 6B.
Figure 11:
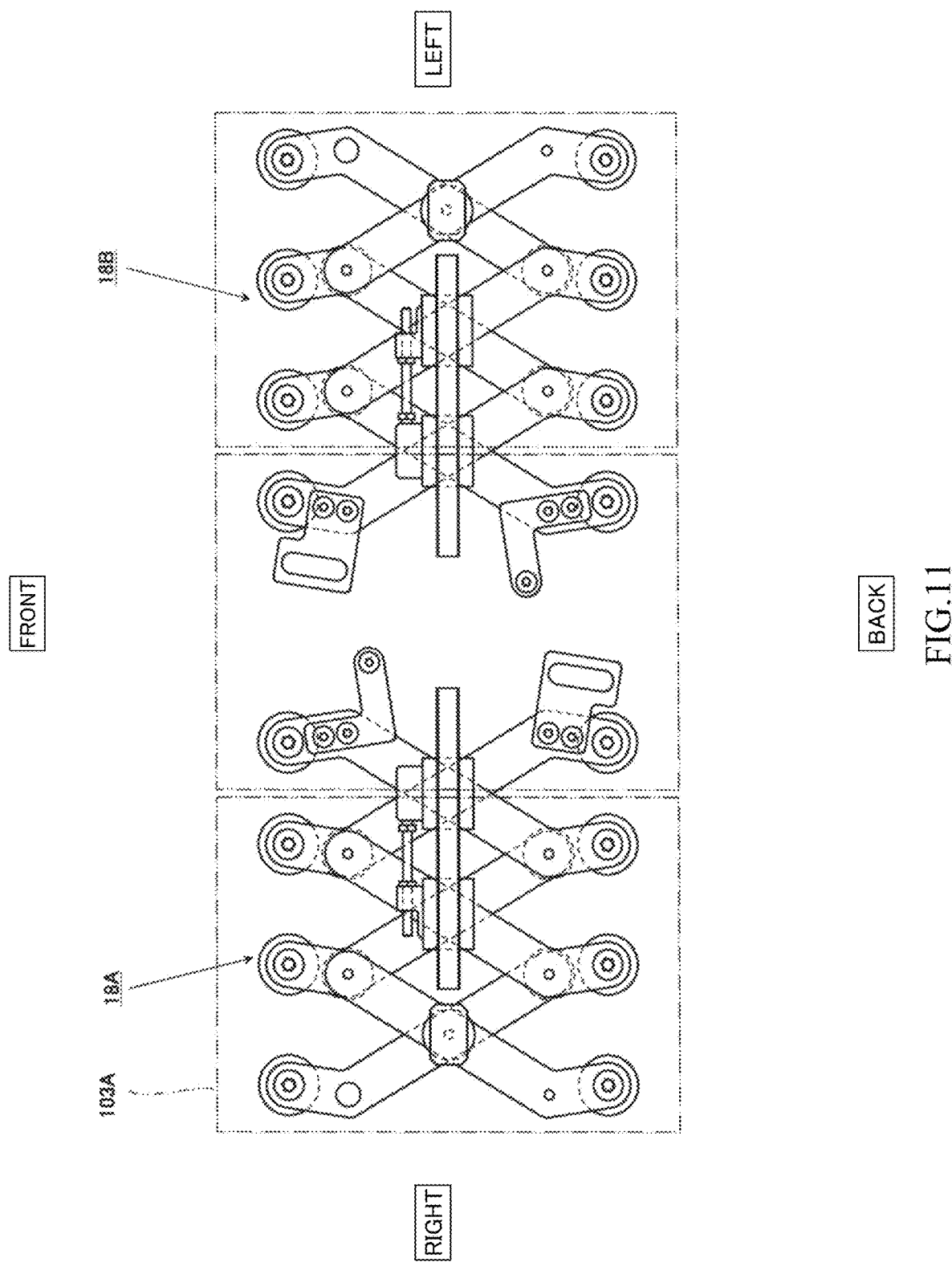
FIG. 11 is a schematic diagram showing a state that the robot enters while the robot system is operated in line with the flowcharts shown in FIGS. 6A and 6B.

As shown in FIG. 8, etc., the second hand 18B includes a second engager (engager) 92A in place of the first engager 91A and a second engagement receiver (engagement receiver) 92B in place of the first engagement receiver 91B. In the second hand 18B, a link structure identical to the link structure (first link structure) 83 of the first hand 18A serves as a second link structure.

Although Embodiment 1 employs a configuration in which the workpieces 103 are sucked and held by the suction end devices 8, this is not intended to be limiting. For example, a configuration may be employed in which the workpiece 103 is gripped by a pair of claws arranged in the front-back direction, etc.

In Embodiment 1, the configuration in which the suction end devices 8A to 8D (8E to 8H) are arranged side by side in the left-right direction is employed in the case where the workpieces 103 are arranged side by side in the left-right direction. In the case where the workpieces 103 are arranged side by side in the front-back direction, a configuration is employed in which the suction end devices 8A to 8D (8E to 8H) are arranged side by side in the front-back direction.

Although the robot system 100 according to Embodiment 1 employs a configuration in which the first hand 18A includes the first engager 91A and the first engagement receiver 91B and the second hand 18B includes the second engager 92A and the second engagement receiver 92B, this is not intended to be limiting. A configuration may be employed in which the first hand 18A includes the first engager 91A and the second hand 18B includes the second engagement receiver 92B.

[Operation and Advantages of Robot System]

Hereinafter, the operation and advantages of the robot system 100 according to Embodiment 1 will be described with reference to FIGS. 1 to 11. The processor 110a of the controller 110 carries out the operation described below by retrieving and executing a program stored in the storage 110b.

Figure 6A:
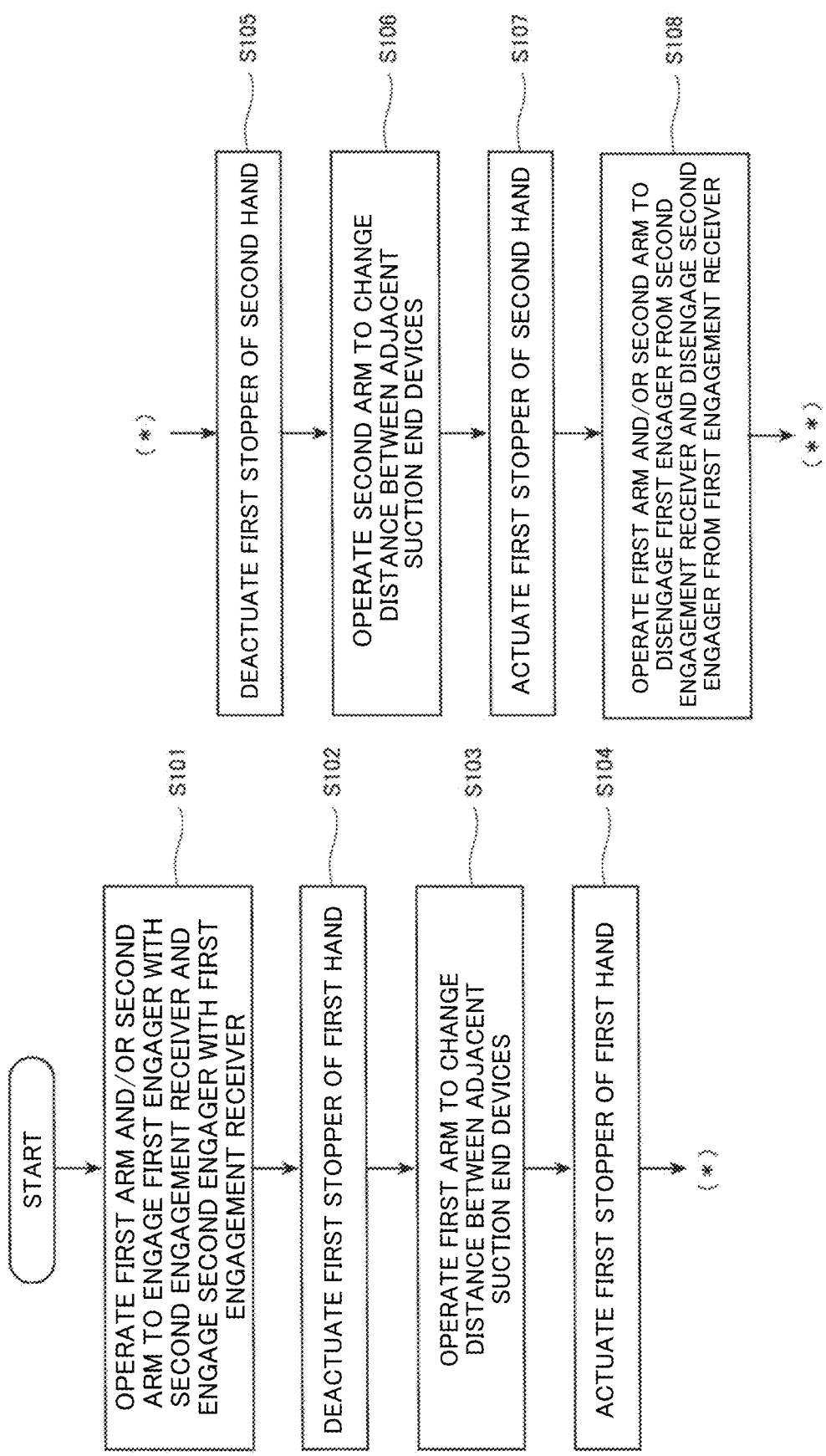
FIG. 6A is a flowchart showing an example of the operation of the robot system according to Embodiment 1.
Figure 6B:
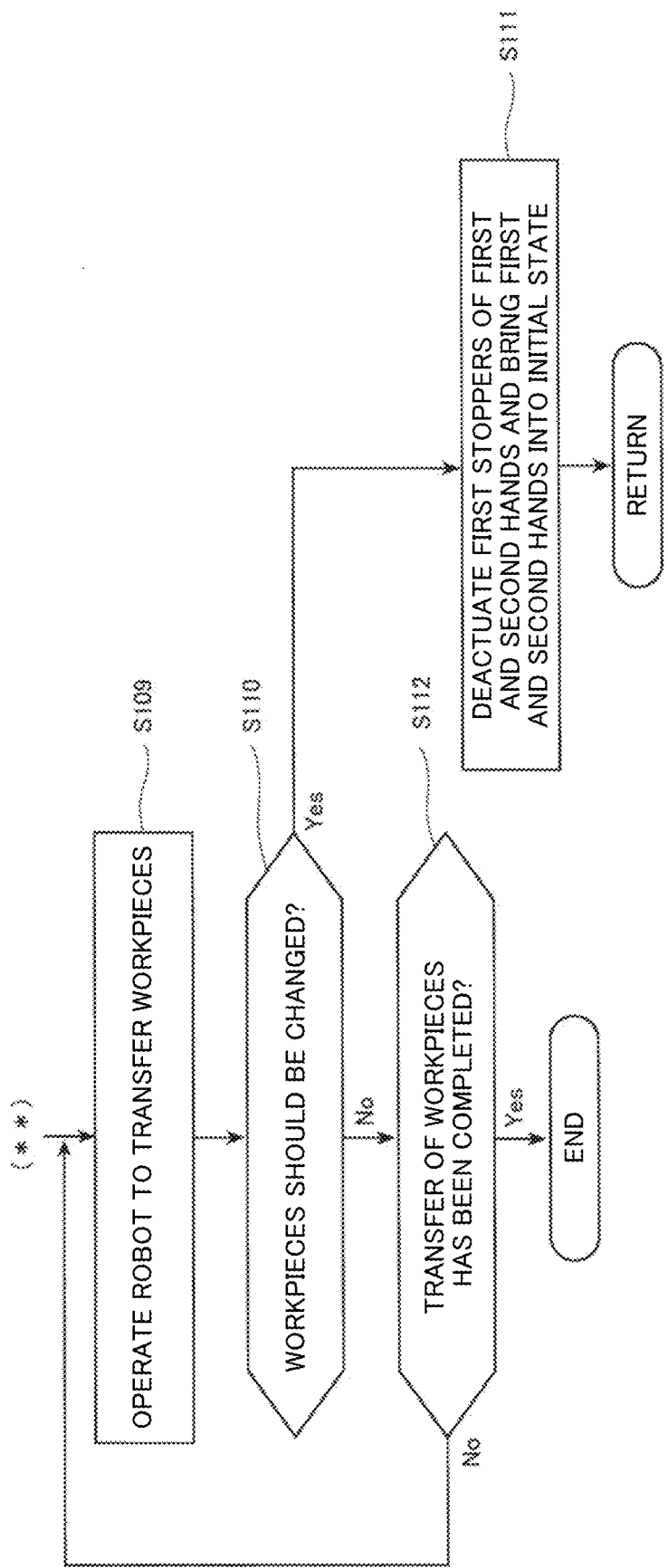
FIG. 6B is a flowchart showing an example of the operation of the robot system according to Embodiment 1.

FIGS. 6A and 6B are flowcharts showing an example of the operation of the robot system according to Embodiment 1. FIGS. 7 to 11 are schematic diagrams showing different states that the robot enters while the robot system is operated in line with the flowcharts shown in FIGS. 6A and 6B.

Figure 7:
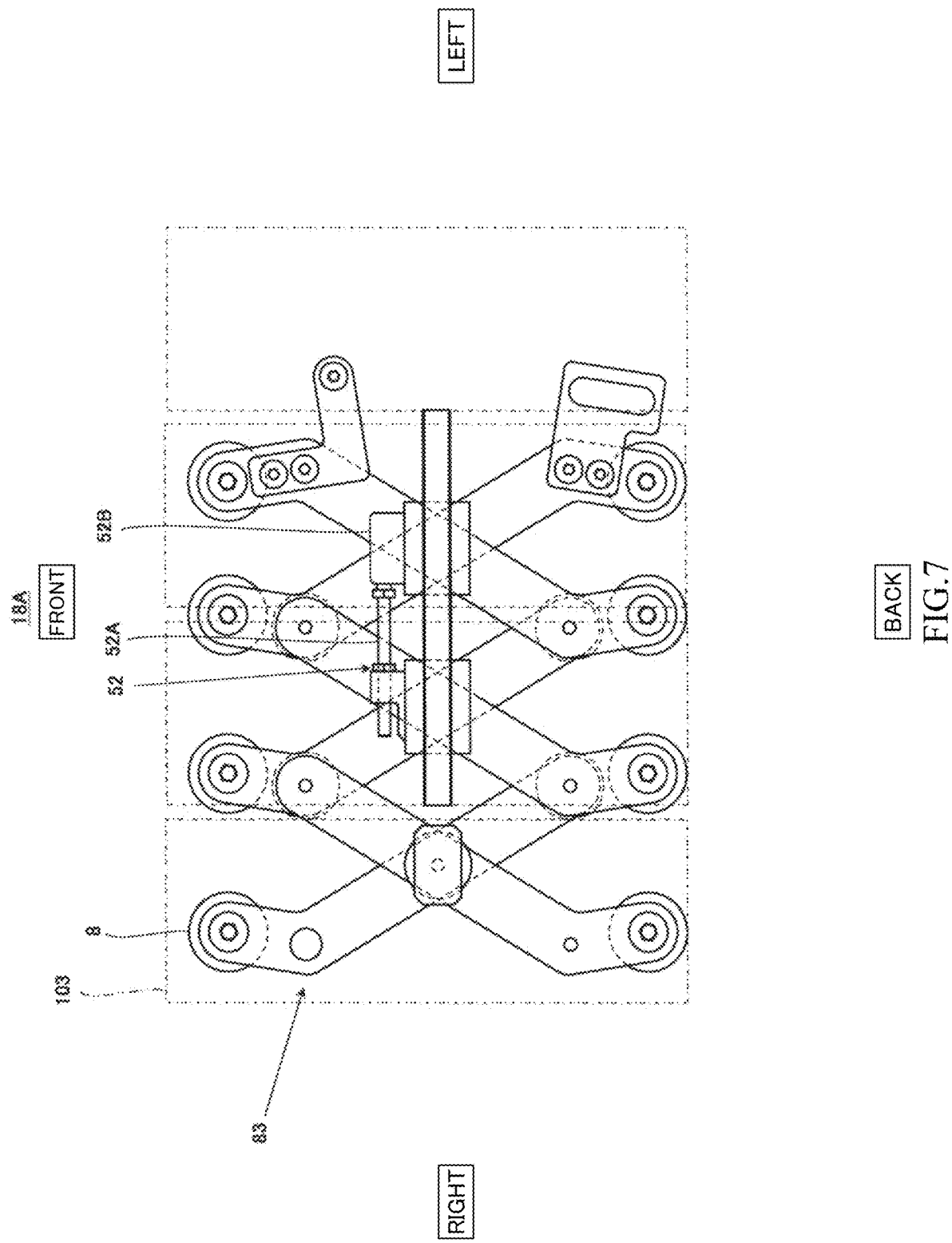
FIG. 7 is a schematic diagram showing a state that the robot enters while the robot system is operated in line with the flowcharts shown in FIGS. 6A and 6B.

First, as shown in FIG. 7, each of the first and second hands 18A and 18B is assumed to be in an initial state where the first member 52A is in contact with the second member 52B. In Embodiment 1, the respective first stoppers 41 of the first and second hands 18A and 18B are assumed to be in action when the first and second hands 18A and 18B are in the initial state. That is, the tape 84B is assumed to be sandwiched between the distal end of the linear actuator 43 of the first stopper 41 and the second stationary member 42.

It is further assumed that instruction information representing an instruction to hold and transfer the workpieces 103 indicated by dashed-double dotted lines has been input from an operator to the controller 110 through the input interface 110c.

In this case, the controller 110 carries out the operation described below since the first and second hands 18A and 18B in the initial state cannot hold the workpieces 103.

First, the controller 110 operates the first arm 13A and/or second arm 13B to engage the first engager 91A of the first hand 18A with the second engagement receiver 92B of the second hand 18B and engage the second engager 92A of the second hand 18B with the first engagement receiver 91B of the first hand 18A (step S101).

Specifically, the controller 110 operates the first arm 13A and/or second arm 13B to bring the first and second hands 18A and 18B close to each other. The controller 110 then operates the first arm 13A and/or second arm 13B to insert the pin-shaped first engager 91A and second engager 92A into the holes serving as the second engagement receiver 92B and first engagement receiver 91B, respectively.

Subsequently, the controller 110 deactivates the first stopper 41 of the first hand 18A (step S102). Specifically, the controller 110 drives the linear actuator 43 to withdraw the distal end of the piston of the first stopper 41 away from the tape 84B.

Subsequently, the controller 110 operates the first arm 13A to change the distance between the adjacent suction end devices 8 (step S103). That is, in the robot system 100 according to Embodiment 1, the first arm 13A holding the first hand 18A functions as an actuator that changes the distance between the adjacent suction end devices 8 of the first hand 18A.

Subsequently, once the distance between the suction end devices 8 reaches a distance sufficient to accommodate the size of the workpiece 103, the controller 110 actuates the first stopper 41 of the first hand 18A (step S104).

The suction end device 8-to-suction end device 8 distance sufficient to accommodate the size of the workpiece 103 is predetermined, for example, by experimentation, and the predetermined distance is stored in the storage 110b.

Subsequently, the controller 110 deactuates the first stopper 41 of the second hand 18B (step S105).

Subsequently, the controller 110 operates the second arm 13B to change the distance between the adjacent suction end devices 8 (step S106). After that, once the distance between the suction end devices 8 reaches a distance sufficient to accommodate the size of the workpiece 103, the controller 110 actuates the first stopper 41 of the second hand 18B (step S107).

Subsequently, the controller 110 operates the first arm 13A and/or second arm 13B to disengage the first engager 91A of the first hand 18A from the second engagement receiver 92B of the second hand 18B and disengage the second engager 92A of the second hand 18B from the first engagement receiver 91B of the first hand 18A (step S108).

Subsequently, the controller 110 operates the robot 101 (first and second arms 13A and 13B) to transfer the workpieces 103 (step S109).

Specifically, the controller 110 operates the first and second arms 13A and 13B to locate the first and second hands 18A and 18B above the workpieces 103. The controller 110 then operates the vacuum generator 25 and operates the valve elements of the on-off valves 94A and 94B to be in an opened state. After that, the controller 110 operates the first and second arms 13A and 13B to bring the suction end devices 8 into contact with the workpieces 103. This enables the suction end devices 8 to suck and hold the workpieces 103.

Subsequently, the controller 110 operates the first and second arms 13A and 13B to transfer the workpieces 103 to a predetermined location. The controller 110 then operates the valve elements of the on-off valves 94A and 94B to be in a closed state so as to release the workpieces 103.

Subsequently, the controller 110 determines whether a command to change the type, size, weight, or any other property of the workpieces 103 to be transferred has been input through the input interface 110c (step S110). In this step, for example, the controller 110 determines whether a command to transfer workpieces such as workpieces 103A of FIG. 11 which are wider than the workpieces 103 of FIG. 7 has been input through the input interface 110c.

Upon determining that the command to change the type or any other property of the workpieces 103 to be transferred has been input through the input interface 110c (Yes in step S110), the controller 110 deactuates the first stoppers 41 of the first and second hands 18A and 18B, brings the first and second hands 18A and 18B into the initial state (step S11), and returns to step S101.

Upon determining that the command to change the type or any other property of the workpieces 103 to be transferred has not been input through the input interface 110c (No in step S110), the controller 110 determines whether the transfer of the workpieces 103 has been completed (step S112).

Upon determining that the transfer of the workpiece 103 has not been completed (No in step S112), the controller 110 repeats steps S109 to S112 until it is determined that the transfer of the workpieces 103 has been completed.

Upon determining that the transfer of the workpieces 103 has been completed (Yes in step S112), the controller 110 ends the program.

In the robot system 100 according to Embodiment 1, which is configured as described above, the first and second hands 18A and 18B are not equipped with any actuators for changing the distance between the suction end devices 8 (first and second holders). Thus, the robot system 100 is capable of holding and transferring heavier workpieces than conventional robot systems.

In the robot system 100 according to Embodiment 1, the linear actuator 43 of each of the first and second hands 18A and 18B is configured such that the friction force resulting from sandwiching of the tape 84B is greater than the spring force of the spiral spring.

Thus, a compact motor can be used as the driver of the linear actuator 43. This can reduce the increase in the weight of the first hand 18A or second hand 18B, enabling the robot system 100 to hold and transfer heavier workpieces than conventional robot systems.

In the robot system 100 according to Embodiment 1, each of the first and second hands 18A and 18B includes the second stopper 52. This can prevent the adjacent suction end devices from contacting with each other at the time of deactuation of the first stoppers 41.

Embodiment 2

A robot system according to Embodiment 2 differs from the robot system according to Embodiment 1 in that the robot system according to Embodiment 2 includes a first robot including the first arm and a second robot including the second arm.

Hereinafter, an example of the robot system according to Embodiment 2 will be described with reference to FIG. 12.

Figure 12:
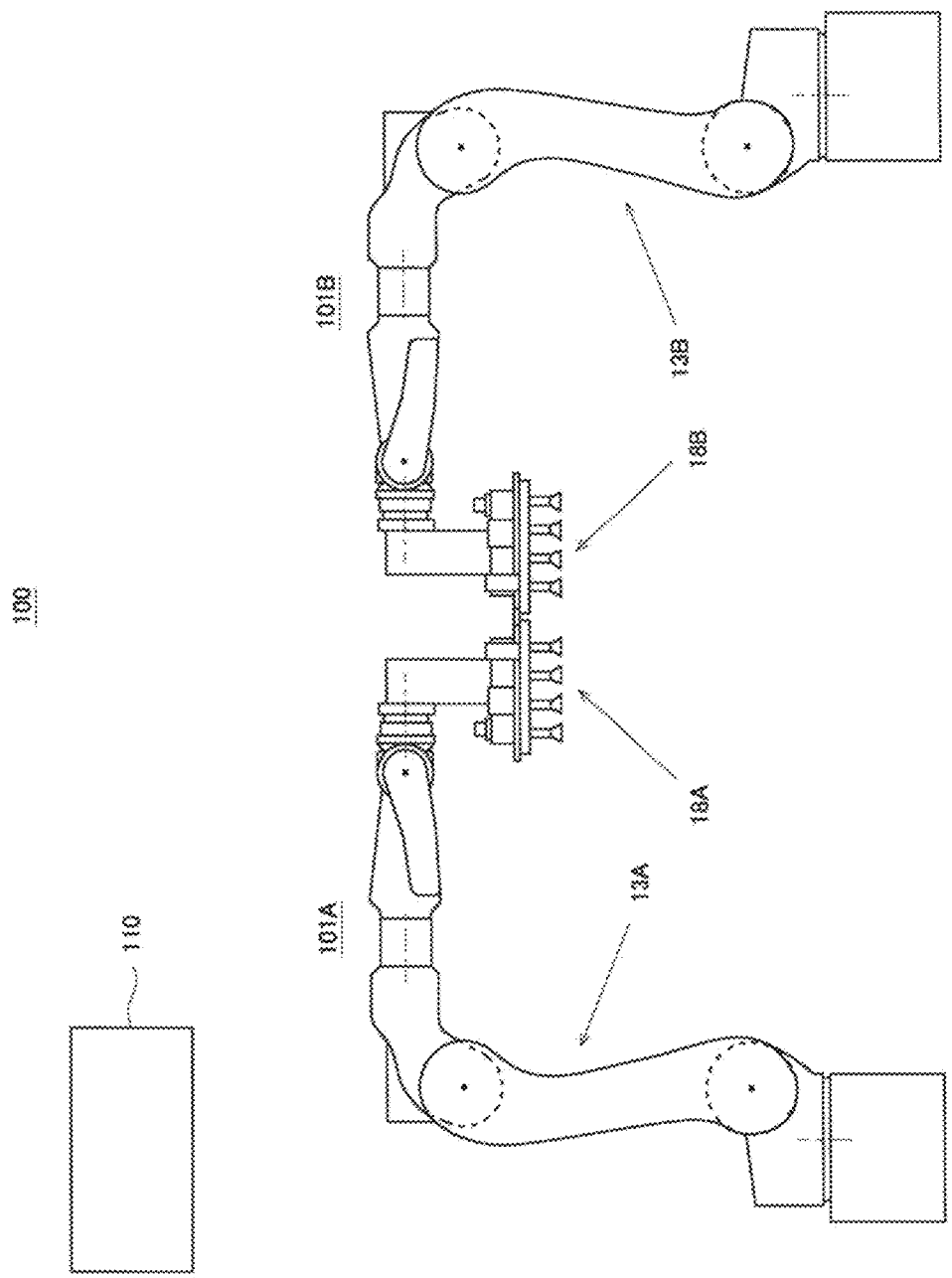
FIG. 12 is a schematic diagram showing a schematic configuration of a robot system according to Embodiment 2.

FIG. 12 is a schematic diagram showing a schematic configuration of the robot system according to Embodiment 2.

As shown in FIG. 12, the robot system 100 according to Embodiment 2 includes two robots 101A and 101B. The robot 101A includes the first arm 13A to which the first hand 18A is connected, and the robot 101B includes the second arm 13B to which the second hand 18B is connected.

In Embodiment 2, known vertical multi-articulated robots are employed as the robots 101A and 101B, which will therefore not be described in detail. Although vertical multi-articulated robots are employed in Embodiment 2, this is not intended to be limiting and any other robots such as horizontal multi-articulated robots may be employed as the robots 101A and 101B.

Although Embodiment 2 employs a configuration in which the robots 101A and 101B are controlled by one and the same controller 110, this is not intended to be limiting and the robots 101A and 101B may be controlled by two or more controllers 110.

The robot system 100 according to Embodiment 2, which is configured as described above, offers the same advantages as the robot system 100 according to Embodiment 1.

From the foregoing description, numerous modifications and other embodiments of the present invention are obvious to those skilled in the art. Accordingly, the foregoing description is to be construed as illustrative only, and is provided for the purpose of teaching those skilled in the art the best mode for carrying out the present invention. The structural and/or functional details may be substantially modified without departing from the scope of the present invention.

INDUSTRIAL APPLICABILITY

With the use of the robot system according to the present invention and the method of operating the robot system, heavier workpieces can be held and transferred than with the use of conventional robot systems. Thus, the robot system according to the present invention and the method of operating the robot system are beneficial in the field of industrial robots.

The invention claimed is:

1. A robot system comprising:
a first hand including first holders, a first link structure that changes a distance between the first holders, and an engager;
a second hand including second holders, a second link structure that changes a distance between the second holders, and an engagement receiver;
a first arm to which the first hand is connected;
a second arm to which the second hand is connected; and
a controller configured to perform:
(A) operating the first arm and/or the second arm to engage the engager with the engagement receiver; and
(B) operating the first arm to change the distance between the first holders after performing (A),
wherein:
the first hand further includes an engagement receiver,
the second hand further includes an engager, and
the controller is configured to, in performing (A), operate the first arm and/or the second arm to engage the engager of the first hand with the engagement receiver of the second hand and engage the engager of the second hand with the engagement receiver of the first hand.

2. The robot system according to claim 1, wherein the controller is further configured to perform:
(C) operating the second arm to change the distance between the second holders after performing (B).

3. The robot system according to claim 1, further comprising:
a dual-arm robot including the first and second arms.

4. The robot system according to claim 1, further comprising:
a first robot including the first arm; and
a second robot including the second arm.

5. A method of operating a robot system, the robot system including: a first hand including first holders, a first link structure that changes a distance between the first holders, and an engager; a second hand including second holders, a second link structure that changes a distance between the second holders, and an engagement receiver; a first arm to which the first hand is connected; and a second arm to which the second hand is connected, the method comprising:
(A) operating the first arm and/or the second arm to engage the engager with the engagement receiver; and
(B) operating the first arm to change the distance between the first holders after performing (A),
wherein:
the first hand further includes an engagement receiver,
the second hand further includes an engager, and
in performing (A), the first arm and/or the second arm is operated to engage the engager of the first hand with the engagement receiver of the second hand and engage the engager of the second hand with the engagement receiver of the first hand.

6. The method according to claim 5, further comprising (C) operating the second arm to change the distance between the second holders after performing (B).

7. The method according to claim 5, wherein the robot system includes a dual-arm robot including the first and second arms.

8. The method according to claim 5, wherein the robot system includes:
a first robot including the first arm; and
a second robot including the second arm.

9. The robot system according to claim 3, further comprising:
a shaft base,
wherein the first arm and the second arm of the dual-arm robot are both connected to the shaft base.

10. The robot system according to claim 1, wherein:
the first link structure includes at least three connection points to change the distance between the first holders, and
the second link structure includes at least three connection points to change the distance between the second holders.

11. The robot system according to claim 1, wherein:
the first links structure and the second link structure each include a corresponding pantograph,
the first link structure changes the distance between the first holders by extending and retracting, and
the second link structure changes the distance between the second holders by extending and retracting.

12. The robot system according to claim 1, wherein:
the first holders utilize suction to hold.

13. The robot system according to claim 1, wherein:
the first holders include a pair of claws.

14. The method according to claim 7, further comprising:
a shaft base,
wherein the first arm and the second arm of the dual-arm robot are both connected to the shaft base.

15. The method according to claim 5, wherein:
the first link structure includes at least three connection points to change the distance between the first holders, and
the second link structure includes at least three connection points to change the distance between the second holders.

16. The method according to claim 5, wherein:
the first links structure and the second link structure each include a corresponding pantograph,
the first link structure changes the distance between the first holders by extending and retracting, and
the second link structure changes the distance between the second holders by extending and retracting.

17. The method according to claim 5, wherein:
the first holders utilize suction to hold.

18. The method according to claim 5, wherein:
the first holders include a pair of claws.

* * * * *